(12) United States Patent  
Stirniman

(10) Patent No.: US 8,389,067 B2
(45) Date of Patent: Mar. 5, 2013

(54) DEPOSITION OF LUBRICANT ONTO MAGNETIC MEDIA

(75) Inventor: Michael J. Stirniman, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 525 days.

(21) Appl. No.: 12/554,798

(22) Filed: Sep. 4, 2009

(65) Prior Publication Data

US 2011/0059260 A1 Mar. 10, 2011

(51) Int. Cl.
*B05D 1/04* (2006.01)
*B05D 5/08* (2006.01)

(52) U.S. Cl. ........ 427/486; 427/475; 427/483; 427/127; 427/131

(58) Field of Classification Search .................. 427/475, 427/483, 486, 127, 131
See application file for complete search history.

(56) References Cited

U.S. PATENT DOCUMENTS

| 4,531,056 | A | 7/1985 | Labowsky et al. |
| 4,542,293 | A | 9/1985 | Fenn et al. |
| 4,748,043 | A | 5/1988 | Seaver et al. |
| 5,858,182 | A * | 1/1999 | Horng et al. ............. 204/192.16 |
| 6,183,831 | B1 | 2/2001 | Hughes et al. |
| 7,259,109 | B2 | 8/2007 | Meagley |
| 2005/0084669 | A1* | 4/2005 | Girt et al. ...................... 428/336 |
| 2009/0274835 | A1* | 11/2009 | Ma et al. ....................... 427/127 |
| 2010/0006595 | A1 | 1/2010 | Ma et al. |

* cited by examiner

*Primary Examiner* — Frederick Parker
(74) *Attorney, Agent, or Firm* — Mueting Raasch & Gebhardt PA

(57) ABSTRACT

Disclosed herein are methods that include inserting a magnetic media into an enclosure and using a non-thermal physical vapor deposition process to deposit a lubricant onto the magnetic media within the enclosure. Also disclosed are methods that include loading a magnetic media that includes a tribological coating into an enclosure and using an electrospray ionization process to deposit a lubricant onto the magnetic media within a vacuum created by the enclosure.

11 Claims, 4 Drawing Sheets

DEPOSITION OF LUBRICANT ONTO MAGNETIC MEDIA

BACKGROUND

A hard disk drive (which may also be referred to as a hard drive or HDD) is a non-volatile memory device utilized for storing different types of data. Hard disk drives can be found in a wide variety of electronic devices and systems, such as, desk-top computer systems, laptop computer systems, servers, portable music/video players, and video game consoles. Note that hard disk drives can be manufactured in different ways. For example, as part of manufacturing a hard disk drive, a thin layer of one or more lubricants are deposited onto both sides of thin film magnetic discs which are eventually incorporated into the hard disk drive. The lubricants are generally some type of perfluoropolyether (PFPE), of which multiple varieties exist, and they may be used in various combinations with each other or with other specialty additives.

There are different techniques for depositing lubricants onto the thin film magnetic discs. For example, one technique involves thermal vaporization of a PFPE lubricant in a vacuum, followed by condensation of the lubricant vapor onto a room temperature thin film disc. However, one drawback of this technique is that the PFPE lubricants supplied to the data storage industry are not pure, but rather are mixtures consisting of a distribution of molecular weights. Each molecular weight component of the mixture has a different vapor pressure, and as a result, the mixture is fractionated by molecular weight as the deposition process proceeds. As such, discs processed at different times have a different average molecular weight of lubricant deposited, with lighter materials on discs near the beginning of the process and heavier materials on discs later. The cycle of light material to heavier material repeats itself each time the liquid lubricant is recharged into the evaporator. A second drawback is that deposition of lubricant films containing two or more different chemical components will involve a separate evaporation process station for each component. A third drawback is the use of high temperatures for extended periods of time, which may lead to thermal degradation of the PFPE material.

SUMMARY

A method, in one embodiment, can include inserting a magnetic media into an enclosure. Furthermore, the method can include using a non-thermal physical vapor deposition process to deposit a lubricant onto the magnetic media within the enclosure.

In another embodiment, a system can include an enclosure for receiving a magnetic media. Additionally, the system can include a conductive capillary tip that is internal to the enclosure along with a reservoir for supplying a lubricant to the conductive capillary tip via a capillary. Moreover, the system can include a negative voltage supply that is coupled to the conductive capillary tip and for negatively biasing the conductive capillary tip. Note that the conductive capillary tip can be for outputting the lubricant onto the magnetic media within the enclosure.

In yet another embodiment, a method can include loading a magnetic media that includes a tribological coating into an enclosure. In addition, the method can include using an electrospray ionization process to deposit a lubricant onto said magnetic media within a vacuum created by the enclosure.

While particular embodiments in accordance with the invention have been specifically described within this Summary, it is noted that the invention and the claimed subject matter are not limited in any way by these embodiments.

The drawings referred to in this description should not be understood as being drawn to scale except if specifically noted.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Figure 1:
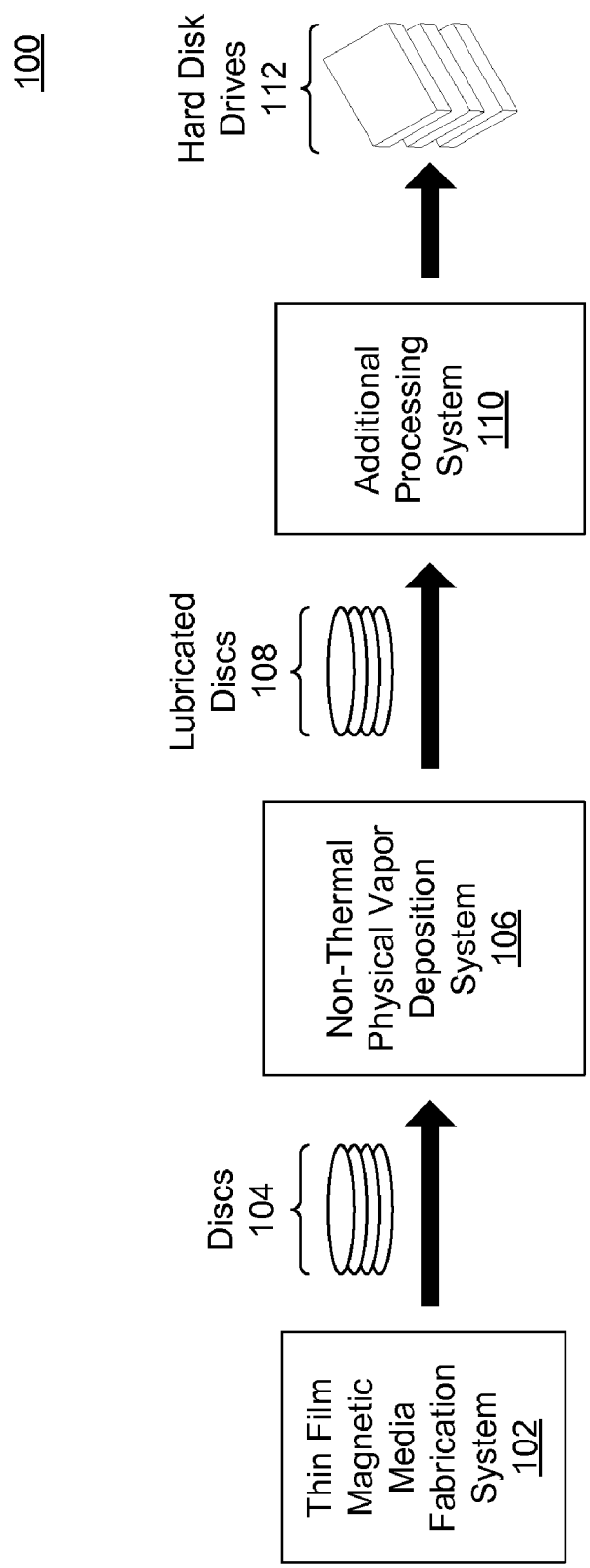
FIG. 1 is a block diagram of a hard disk drive fabrication system in accordance with various embodiments of the invention.

FIG. 1 is a block diagram of a hard disk drive fabrication system 100 in accordance with various embodiments of the invention. For example, the hard disk drive fabrication system 100 can include, but is not limited to, a thin film magnetic media fabrication system 102, a non-thermal physical vapor deposition system 106, and an additional processing system 110. As such, the hard disk drive fabrication system 100 can produce hard disk drives 112 that each include one or more lubricated thin film magnetic media 108.

Specifically, within the thin film magnetic disc fabrication system 102, one or more thin film magnetic media or discs (e.g., 104) can be fabricated which can be eventually incorporated into one or more hard disk drives. It is noted that the one or more thin film magnetic media or discs 104 can be fabricated in a wide variety of ways. For example in one embodiment, the one or more thin film magnetic media 104 can be implemented to include, but not limited to, a tribological coating that includes a layer of thin amorphous carbon.

Within FIG. 1, once the one or more thin film magnetic media or discs 104 have been fabricated, one or more of them can be loaded or inserted into the non-thermal physical vapor deposition system 106. Once loaded, one or more lubricants can be deposited onto the one or more exposed surfaces of the thin film magnetic media 104 using a non-thermal physical vapor deposition process in accordance with various embodiments of the invention. In one embodiment, the one or more lubricants are deposited onto the thin film magnetic media 104 to prevent corrosion and to protect it from being damage if a hard disk drive head comes into contact with it. Note that specific operations of the non-thermal physical vapor deposition system 106 will be described with reference to FIG. 2, but is not limited to such. It is pointed out that the one or more lubricants utilized within the non-thermal physical vapor deposition system 106 can be implemented in a wide variety of ways. For example in various embodiments, the one or more lubricants can include, but are not limited to, one or more different types of perfluoropolyether (PFPE). In one embodiment, a tetrahydroxy perfluoropolyether, which may be found under the product name of Fomblin® Z Tetraol®, can be the lubricant utilized within the non-thermal physical vapor deposition system 106, but is not limited to such.

Once the non-thermal physical vapor deposition system 106 produces the one or more lubricated media or discs 108, they can be loaded or inserted into the additional processing system 110. It is noted that a wide variety of activities can be performed on the one or more lubricated thin film magnetic media 108 by the additional processing system 110. For example in various embodiments, the activities of the additional processing system 110 can include, but is not limited to, a final polishing operation of the one or more lubricated thin film magnetic media 108 (which may be referred to as "tape buff/wipe"), testing the one or more lubricated thin film magnetic media 108 to determine if each will support fly height and to detect any defects, and/or incorporating the one or more lubricated thin film magnetic media 108 into one or more hard disk drives 112. In this manner, the additional processing system 110 can produce one or more hard disk drives 112 that each include one or more lubricated thin film magnetic media or discs 108.

Figure 2:
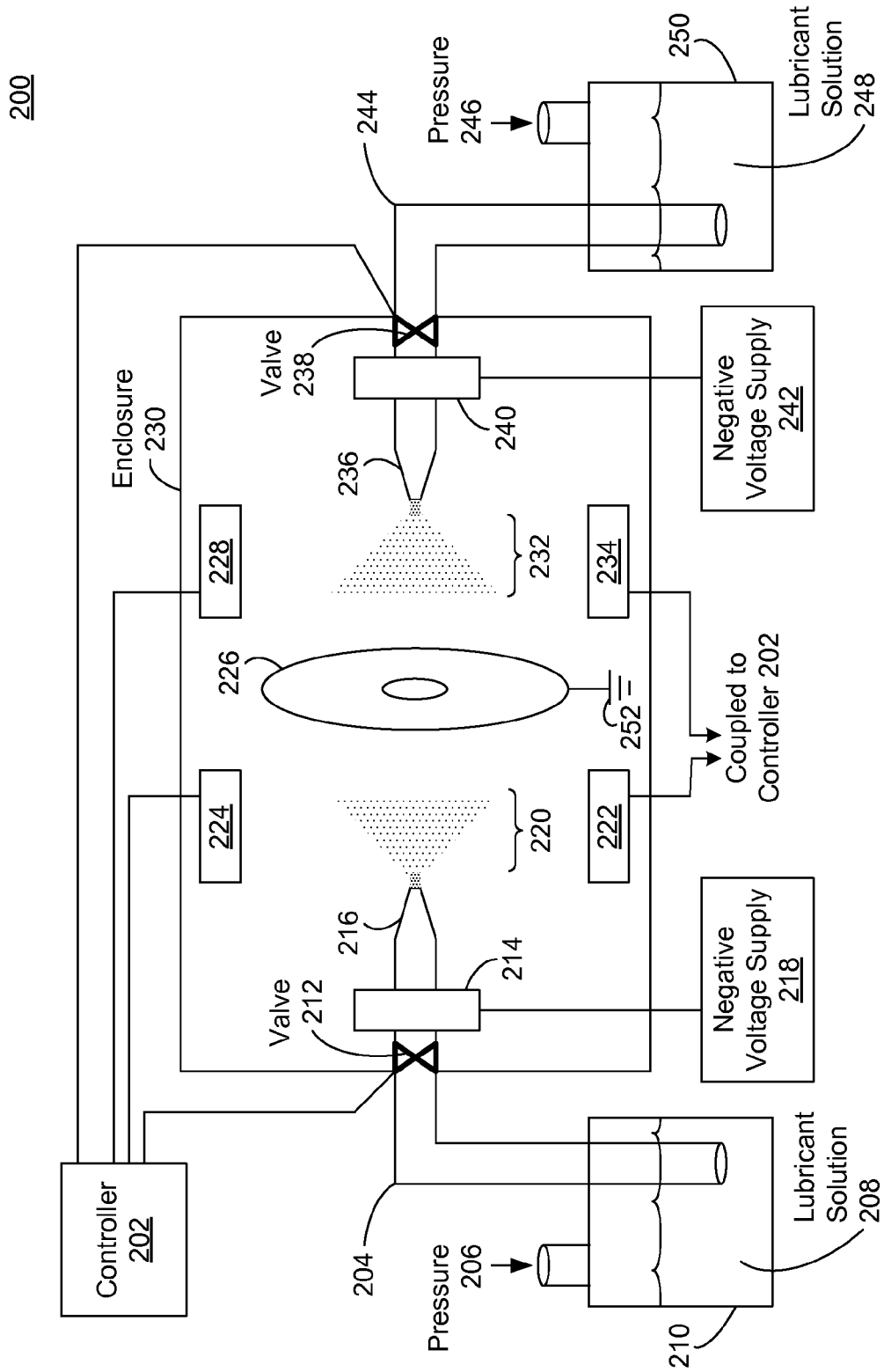
FIG. 2 is a block diagram of a non-thermal physical vapor deposition system in accordance with various embodiments of the invention.

FIG. 2 is a block diagram of a non-thermal physical vapor deposition system 200 in accordance with various embodiments of the invention. It is pointed out that in an embodiment, the non-thermal physical vapor deposition system 200 can be an implementation of the non-thermal physical vapor deposition system 106 (FIG. 1), but is not limited to such. Within FIG. 2, a thin film magnetic media or disc 226 (similar to media 104) can be loaded or inserted into an enclosure 230 of the system 200 for a temporary amount of time so that a non-thermal physical vapor deposition process in accordance with an embodiment of the invention can deposit one or more lubricants onto one or more of its exposed surfaces. Note that in one embodiment, the one or more lubricants are deposited onto the thin film magnetic media 226 to improve its resistance to corrosion and to protect or guard it from being worn when a head of a hard disk drive comes into contact with it. After which, the thin film magnetic disc 226 can be unloaded or removed from the enclosure 230. Subsequently, the thin film magnetic disc 226 may be eventually incorporated as part of a hard disk drive (e.g., 112).

Within one embodiment, the non-thermal physical vapor deposition system 200 can include, but is not limited to, a controller or computing device 202, the physical vapor deposition enclosure 230, a reservoir 210 which can store a lubricant solution 208, an adjustable pressure 206 for the reservoir 210, a capillary 204, a valve 212, a conductive block 214, a negative high-voltage supply 218, a conductive capillary tip 216, biased shielding (or electrodes) 222, 224, 228, and 234, a conductive capillary tip 236, a conductive block 240, a negative high-voltage supply 242, a valve 238, a capillary 244, a reservoir 250 that can store a lubricant solution 248, and an adjustable pressure 246 for the reservoir 250. It is pointed out that in an embodiment, the non-thermal physical vapor deposition system 200 does not include the enclosure 230.

Within FIG. 2, the thin film magnetic media or disc 226 can be loaded or inserted into the physical vapor deposition enclosure 230. Note that a wide variety of pressures can exist within the physical vapor deposition enclosure 230. For example, an ambient pressure or sub-ambient pressure can exist within the physical vapor deposition enclosure 230, but is not limited to such. Note that in an embodiment, ambient pressure can signify that no special effort was made to control pressure within the enclosure 230 (e.g., the enclosure 230 may not be sealed), but is not limited to such. Furthermore, in one embodiment, once the physical vapor deposition enclosure 230 is sealed, a vacuum can be created within it (e.g., approximately $1 \times 10^{-6}$ Torr, but not limited to such). It is noted that an electrospray ionization can be utilized to deposit one or more lubricants onto one or more surfaces of the thin film magnetic media 226. For example in one embodiment, the electrospray ionization is a process of forcing a low-volume stream of the lubricant solutions 208 and 248 through the conductive capillary tips 216 and 236, respectively. Each of the conductive capillary tips 216 and 236 can be biased at a relatively high negative voltage (e.g., approximately −1 kilovolt (kV) to −10 kV) via the negative voltage supplies 218 and 242, respectively. Therefore, as the lubricant solutions 208 and 248 pass through their respective conductive capillary tips 216 and 236, the lubricant solutions 208 and 248 pick up a negative electrical charge. Note that the internal repulsion within each of the lubricant solutions 208 and 248 due to the negative electrical charge is sufficient to force each of the exiting streams to rapidly expand into lubricant aerosol nano-clusters 220 and 232, respectively, of very small negatively charged lubricant droplets with diameters as low as a few tens of nanometers, but not limited to such.

The solvent solutions 208 and 248 can be stored by the reservoirs 210 and 250, respectively. The solvent solutions 208 and 248 can each be implemented in a wide variety of ways. For example in one embodiment, the solvent solutions 208 and 248 can each be, but is not limited to, a solution of one or more lubricants (e.g., a perfluoropolyether (PFPE)) dissolved in a solvent at approximately 1-10% concentration (w/w). In addition, the one or more lubricants of the solvent solutions 208 and 248 can include, but are not limited to, one or more different types of perfluoropolyether. For example in one embodiment, the solvent solutions 208 and 248 can each include a tetrahydroxy perfluoropolyether, which may be found under the product name of Fomblin® Z Tetraol®, but is not limited to such. The solvent of the solvent solutions 208 and 248 can be implemented in a wide variety of ways. For example, the solvent can be, but is not limited to, a fluorinated solvent or a non-fluorinated solvent. Note that in one embodiment, the solvent can be implemented with DuPont™ Vertrel® XF, but is not limited to such. Additionally in an embodiment, the solvent can be implemented with approximately a 50/50 mix of DuPont™ Vertrel® XF with isopropyl alcohol (IPA), but is not limited to such.

Specifically within FIG. 2, it is noted that the adjustable pressure 206 can apply pressure to the solvent solution 208 stored within the reservoir 210 while the adjustable pressures 246 can apply pressure to the solvent solution 248 stored within the reservoir 210. As such, when the controller 202 opens the capillary valve 212, for example, the pressure 206 can cause or force the lubricant solution 208 to travel or traverse out of the reservoir 210 and through the capillary 204, through the capillary value 212, and through the conductive capillary tip 216 to be output into the enclosure 230. Similarly, when the controller 202 opens the capillary valve 238, for example, the pressure 246 can cause or force the lubricant solution 248 to travel or traverse out of the reservoir 250 and through the capillary 244, through the capillary value 238, and through the conductive capillary tip 236 to be output into the enclosure 230. Furthermore, when the controller 202 closes the capillary valve 212, for example, the pressure 206 can cause or force the lubricant solution 208 to remain within the capillary 204 while being restrained by the capillary valve 212. In a similar manner, when the controller 202 closes the capillary valve 238, for example, the pressure 246 can cause or force the lubricant solution 248 to remain within the capillary 244 while being restrained by the capillary valve 238.

As previously mentioned, as the lubricant solutions 208 and 248 pass through their respective conductive capillary tips 216 and 236, the lubricant solutions 208 and 248 pick up a negative electrical charge. As such, the internal repulsion within each of the lubricant solutions 208 and 248 due to the negative electrical charge is sufficient to force each of the exiting streams to rapidly expand into lubricant aerosol nanoclusters 220 and 232, respectively, of very small negatively charged lubricant droplets with diameters as low as a few tens of nanometers, but not limited to such. As the size of the lubricant solution droplet of aerosol 220 and 232 decreases, its saturation vapor pressure increase as $\exp(1/r)$, where r is the radius of the droplet. As such, in an embodiment, this rapid increase in vapor pressure forces the solvent in the lubricant aerosol droplets 220 and 232 to evaporate, leaving a very highly dispersed aerosol of nanoclusters of the nearly non-volatile lubricant. The vaporized solvent can be pumped away by either the system pumping or a cold trap (not shown), while the non-volatile lubricant aerosols 220 and 232 travel in an essentially line-of-sight path to the magnetic media 226 and condense on its surfaces. Therefore, the solvent in the lubricant aerosols 220 and 232 is evaporated even before its lubricant nanoclusters strike the surfaces of the thin film magnetic media 226. It is pointed out that since the saturation vapor pressure of the lubricant aerosol nanoclusters 220 and 232 are way above their vapor pressure, the lubricant aerosol nanoclusters 220 and 232 will condense on the first surface that they strike or encounter. In one embodiment, since the lubricant nanoclusters 220 and 232 have retained some or all of the negative charge of the original aerosol, the thin film magnetic media 226 can be coupled to ground 252, coupled to a positive voltage (e.g., positive voltage 254 shown in FIG. 3), and/or biased shielding (or electrodes) 222, 224, 228, and 234 can be utilized as focusing optics to improve lubricant utilization, uniformity, film properties, or some combination of the three.

Within FIG. 2, note that each of the conductive capillary tips 216 and 236 can be implemented in a wide variety of ways. For example in one embodiment, each of the conductive capillary tips 216 and 236 can be implemented with an electrospray nozzle designed for mass spectrometer applications, but is not limited to such. In an embodiment, each of the conductive capillary tips 216 and 236 can be implemented with, but is not limited to, an exit aperture having a diameter of approximately 50 microns (or approximately 0.05 millimeters) that can be coated on the outside with an electrical conductor. In addition, the conductive capillary tip 216 can be electrically coupled to the conductive block 214, which is electrically coupled to the negative high-voltage supply 218. The conductive capillary tip 236 can be electrically coupled to the conductive block 240, which is electrically coupled to the negative high-voltage supply 242. As such, the negative voltage supply 218 can supply any negative voltage to the conductive capillary tip 216 via conductive block 214 while the negative voltage supply 242 can supply any negative voltage to the conductive capillary tip 236 via conductive block 240. The negative voltage supplies 218 and 242 can be implemented in a wide variety of ways. For example, the negative voltage supplies 214 and 242 can each be implemented with, but is not limited to, a solid-state voltage supply or a solid-state voltage supply that does not supply much current (e.g., in the microamps range).

It is pointed out that as each of the lubricant solutions 208 and 248 exits the conductive capillary tips 216 and 236 (respectively) with excess negative charge, a Taylor Cone (not shown) is formed at each exit aperture of the conductive capillary tips 216 and 236. After which, each of the lubricant solutions 208 and 248 forms a jet or stream that quickly expands in a plume of lubricant aerosols 220 and 232, respectively, due to the internal repulsion of the excess negative charge that was picked up from the conductive capillary tips 216 and 236. Note that by performing this functionality within in a vacuum and the solvent within the lubricant solutions 208 and 248 having a very high vapor pressure (e.g., it boils at about 60 degrees Celsius at ambient pressure), the solvent will evaporate almost immediately from the lubricant aerosols 220 and 232. As such, the lubricant aerosols 220 and 232 are made up of negatively charged nanoclusters of lubricant.

Within FIG. 2, it is noted that each of the capillary valves 212 and 238 can be implemented in a wide variety of ways. For example in one embodiment, each of the capillary valves 212 and 238 can be implemented with, but is not limited to, a pulsed solenoid valve that pulses on and off. As such, when capillary valves 212 and 238 are opened, the resulting lubricant aerosols 220 and 232 (respectively) are produced almost immediately. Note that in an embodiment, the deposition of the one or more lubricants of the lubricant aerosols 220 and 232 onto the one or more surfaces of the thin film magnetic media or disc 226 can be controlled by the capillary valves 212 and 238 instead of by the amount of time the magnetic media 226 is in and out of the deposition system. Therefore, the capillary valves 212 and 238 of the non-thermal physical vapor deposition system 200 can be utilized to control the lubricant deposition as opposed to strictly time. The capillary valves 212 and 238 can each be coupled to a controller (or computing device) 202 which can independently control the operation of each of them. For example in one embodiment, the controller 202 can separately transmit an electrical signal (e.g., 3 volts signal) to each of the capillary valves 212 and 238 which causes each to open or close.

In one embodiment, the controller 202 can be electrically coupled to each of the biased shielding (or electrodes) 222, 224, 228, and 234. In this manner, the controller 202 can independently control the operations of the electrodes 222, 224, 228, and 234, which in turn are able to direct or guide or focus the negatively changed lubricant aerosol 220 and 232 onto the surfaces of the thin film magnetic media 226. It is noted that the functionality and/or operations of the controller 202 can be controlled or managed by software, by firmware, by hardware or by any combination thereof, but is not limited to such. Moreover in an embodiment, the controller 202 can be part of a user interface for the non-thermal physical vapor deposition system 200.

Within FIG. 2, note that within the non-thermal physical vapor deposition system 200, the lubricant solutions 208 and 248 are not heated in one embodiment, thereby reducing any risk of thermal degradation. In addition, in an embodiment, there is no thermal fractionation by vapor pressure of the lubricant solutions 208 and 248, which means the entire molecular weight distribution of the lubricant is deposited at once onto the thin film magnetic media 226, and there is no change in the distribution over time. Similarly, in one embodiment, the lubricant solutions 208 and 248 can each include mixtures of lubricants with very different vapor pressures, wherein the composition of the mixture in each of the lubricant solutions 208 and 248 is retained within the electrospray droplets of the aerosol 220 and 232, respectively.

In various embodiments, the biased shielding (or electrodes) 222, 224, 228, and 234 of the non-thermal physical vapor deposition system 200 can be located inside or outside of the enclosure 230. Additionally, the adjustable pressure 206 for the reservoir 210 and the adjustable pressure 246 for the reservoir 250 can each be set at a wide variety of pressures. For example in one embodiment, the adjustable pressures 206 and 246 can each be set within the range of approximately 2-10 atmospheres (atm), but is not limited to such. It is noted that within one embodiment, the non-thermal physical vapor deposition system 200 can be implemented to include a single reservoir (e.g., 210 or 250) from which both capillaries 204 and 244 can extract lubricant solution (e.g., 208 or 248).

It is noted that the non-thermal physical vapor deposition system 200 may not include all of the elements illustrated by FIG. 2. Additionally, the non-thermal physical vapor deposition system 200 can be implemented to include one or more elements not illustrated by FIG. 2. It is pointed out that the non-thermal physical vapor deposition system 200 can be utilized or implemented in any manner similar to that described herein, but is not limited to such.

FIG. 3 is a block diagram of a portion of a non-thermal physical vapor deposition system 200' in accordance with various embodiments of the invention which includes an array of conductive capillary tips or nozzles (e.g., 216 and 216'). It is pointed out that the elements of FIG. 3 having the same reference numbers as the elements of any other figure herein can operate or function in any manner similar to that described herein, but are not limited to such. Note that in one embodiment, the non-thermal physical vapor deposition system 200' can be an implementation of the non-thermal physical vapor deposition system 106 (FIG. 1), but is not limited to such.

Specifically in one embodiment, the non-thermal physical vapor deposition system 200' can include an array or multiple conductive capillary tips (e.g., 216 and 216') that can be utilized for depositing one or more lubricants (e.g., 208) onto each surface of the thin film magnetic media 226 to further improve lubricant deposition uniformity, but is not limited to such. It is pointed out that FIG. 3 illustrates slightly more than half of the non-thermal physical vapor deposition system 200'. For example in an embodiment, the non-thermal physical vapor deposition system 200' can include elements similar to those shown in the non-thermal physical vapor deposition system 200 of FIG. 2 that are located to the right of the thin film magnetic media 226. Moreover, the additional elements can include an array or multiple conductive capillary tips or nozzles (e.g., similar to tip 236) that can be utilized for depositing one or more lubricants onto another surface of the thin film magnetic media 226. It is understood that the non-thermal physical vapor deposition system 200' of FIG. 3 can function and operate in a manner similar to the non-thermal physical vapor deposition system 200 of FIG. 2, but is not limited to such. It is pointed out that in one embodiment, the non-thermal physical vapor deposition system 200' of FIG. 3 does not include the enclosure 230.

Within FIG. 3, the following description of the non-thermal physical vapor deposition system 200' focuses on those elements that are shown. However, it is understood that similar elements can be implemented to the right of the thin film magnetic media 226 and they can function and operation in a similar manner. In one embodiment, the conductive capillary tips 216 and 216' can feed from the same reservoir 210. More specifically, the adjustable pressure 206 can apply pressure to the solvent solution 208 stored within the reservoir 210. As such, when the controller 202 opens the capillary valve 212', for example, the pressure 206 can cause or force the lubricant solution 208 to travel or traverse out of the reservoir 210 and through the capillary 204', through the capillary value 212', and through the conductive capillary tip 216' to be output into the enclosure 230. Similarly, when the controller 202 opens the capillary valve 212, for example, the pressure 206 can cause or force the lubricant solution 208 to travel or traverse out of the reservoir 210 and through the capillary 204, through the capillary value 212, and through the conductive capillary tip 216 to be output into the enclosure 230. In addition, when the controller 202 closes the capillary valves 212 and 212', for example, the pressure 206 can cause or force the lubricant solution 208 to remain within the capillaries 204 and 204' while being restrained by the capillary valves 212 and 212'.

As the lubricant solution 208 passes through both of the conductive capillary tips 216 and 216', it picks up negative electrical charge. As such, the internal repulsion due to the negative electrical charge within each of the lubricant solutions 208 output by the conductive capillary tips 216 and 216' is sufficient to force each of the exiting streams to rapidly expand into lubricant aerosol nanoclusters 220 and 220', respectively, of very small negatively charged lubricant droplets with diameters as low as a few tens of nanometers, but not limited to such. As the size of the lubricant solution droplet of aerosol 220 and 220' decreases, its saturation vapor pressure increase as exp(1/r), where r is the radius of the droplet. Therefore, in an embodiment, this rapid increase in vapor pressure forces the solvent in the lubricant aerosol droplets 220 and 220' to evaporate, leaving a very highly dispersed aerosol of nanoclusters of the nearly non-volatile lubricant. The vaporized solvent can be pumped away by either the system pumping or a cold trap (not shown), while the non-volatile lubricant aerosols 220 and 220' travel in an essentially line-of-sight path to the magnetic media 226 and condense on its surfaces. In one embodiment, since the lubricant nanoclusters 220 and 220' have retained some or all of the negative charge of the original aerosol, the thin film magnetic media 226 can be coupled to ground (e.g., ground 252 shown in FIG. 2), coupled to a positive voltage 254, and/or biased shielding (or electrodes) 222, 224, 228 (FIG. 2), and 234 (FIG. 2) can be utilized as focusing optics to improve lubricant utilization, uniformity, film properties, or some combination of the three.

Within FIG. 3, each of the conductive capillary tips 216 and 216' can be implemented in a wide variety of ways. For example in an embodiment, each of the conductive capillary tips 216 and 216' can be implemented with an electrospray nozzle designed for mass spectrometer applications, but is not limited to such. In one embodiment, each of the conductive capillary tips 216 and 216' can be implemented with, but is not limited to, an exit aperture having a diameter of approximately 50 microns (or approximately 0.05 millimeters) that can be coated on the outside with an electrical conductor. Furthermore, the conductive capillary tip 216' can be electrically coupled to the conductive block 214', which is electrically coupled to the negative high-voltage supply 218. In addition, the conductive capillary tip 216 can be electrically coupled to the conductive block 214, which is electrically coupled to the conductive block 214', which is coupled to the negative high-voltage supply 218. As such, the negative voltage supply 218 can supply any negative voltage to the conductive capillary tip 216' via conductive block 214' and to the conductive capillary tip 216 via conductive block 214 and the conductive block 214'. The negative voltage supply 218 can be implemented in a wide variety of ways. For example, the negative voltage supply 218 can be implemented with, but is not limited to, a solid-state voltage supply or a solid-state voltage supply that does not supply much current (e.g., in the microamps range).

Note that each of the capillary valves 212 and 212' can be implemented in a wide variety of ways. For example in one embodiment, each of the capillary valves 212 and 212' can be implemented with, but is not limited to, a pulsed solenoid valve that pulses on and off. As such, when capillary valves 212 and 212' are opened, the resulting lubricant aerosols 220 and 220' (respectively) are produced almost immediately. In one embodiment, the deposition of the one or more lubricants of the lubricant aerosols 220 and 220' onto the one or more surfaces of the thin film magnetic media or disc 226 can be controlled by the capillary valves 212 and 212' instead of by the amount of time the magnetic media 226 is in and out of the deposition system. Therefore, the capillary valves 212 and 212' of the non-thermal physical vapor deposition system 200 can be utilized to control the lubricant deposition as opposed to strictly time. The capillary valves 212 and 212' can each be coupled to the controller (or computing device) 202 which can independently control the operation of each of them. For example in one embodiment, the controller 202 can separately transmit an electrical signal (e.g., 3 volts signal) to each of the capillary valves 212 and 212' which causes each to open or close.

In one embodiment, the functionality and/or operations of the controller 202 can be controlled or managed by software, by firmware, by hardware or by any combination thereof, but is not limited to such. Moreover in an embodiment, the controller 202 can be part of a user interface for the non-thermal physical vapor deposition system 200'.

Figure 3:
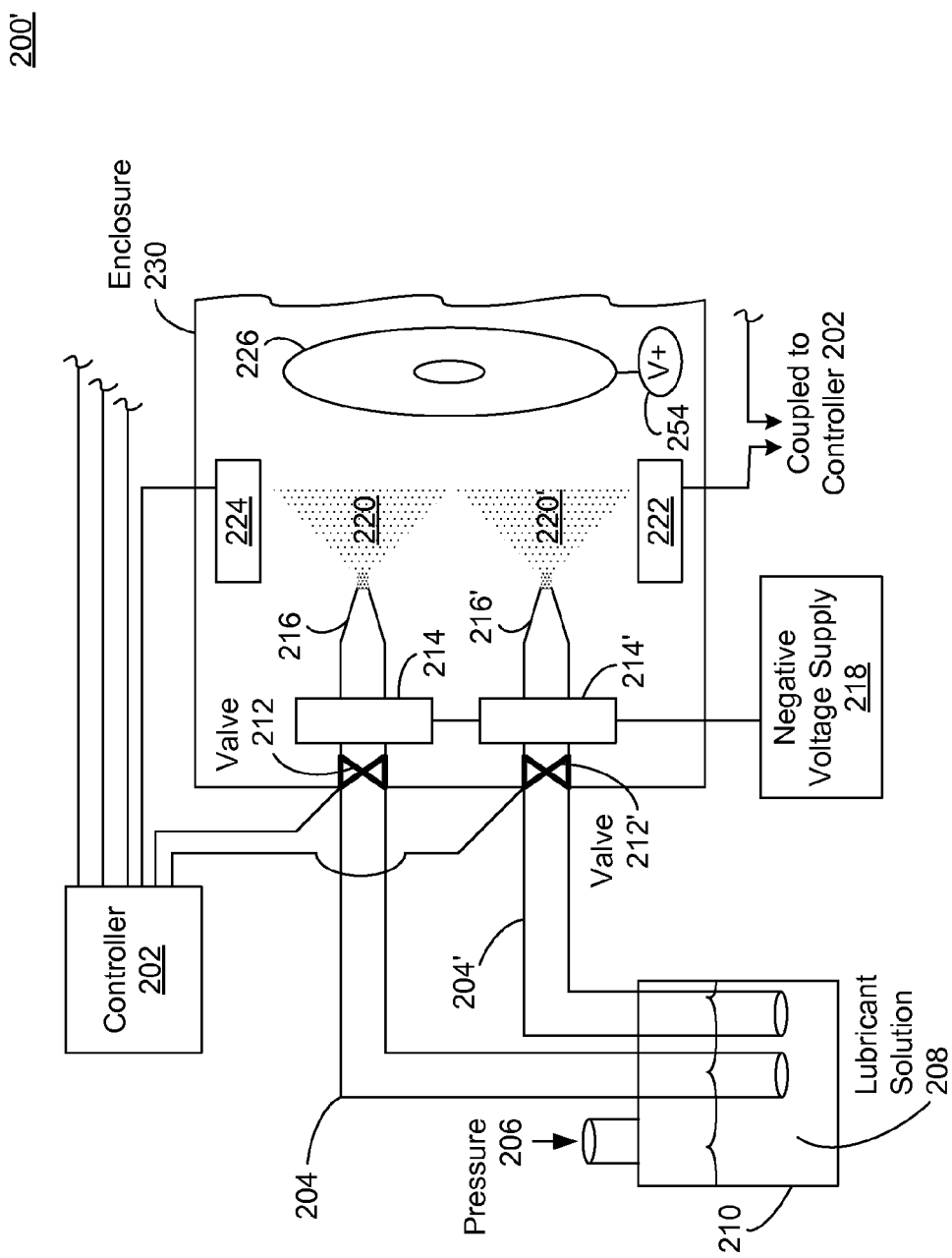
FIG. 3 is a block diagram of another non-thermal physical vapor deposition system in accordance with various embodiments of the invention.

It is noted that the non-thermal physical vapor deposition system 200' may not include all of the elements illustrated by FIG. 3. Additionally, the non-thermal physical vapor deposition system 200' can be implemented to include one or more elements not illustrated by FIG. 3. It is pointed out that the non-thermal physical vapor deposition system 200' can be utilized or implemented in any manner similar to that described herein, but is not limited to such.

Figure 4:
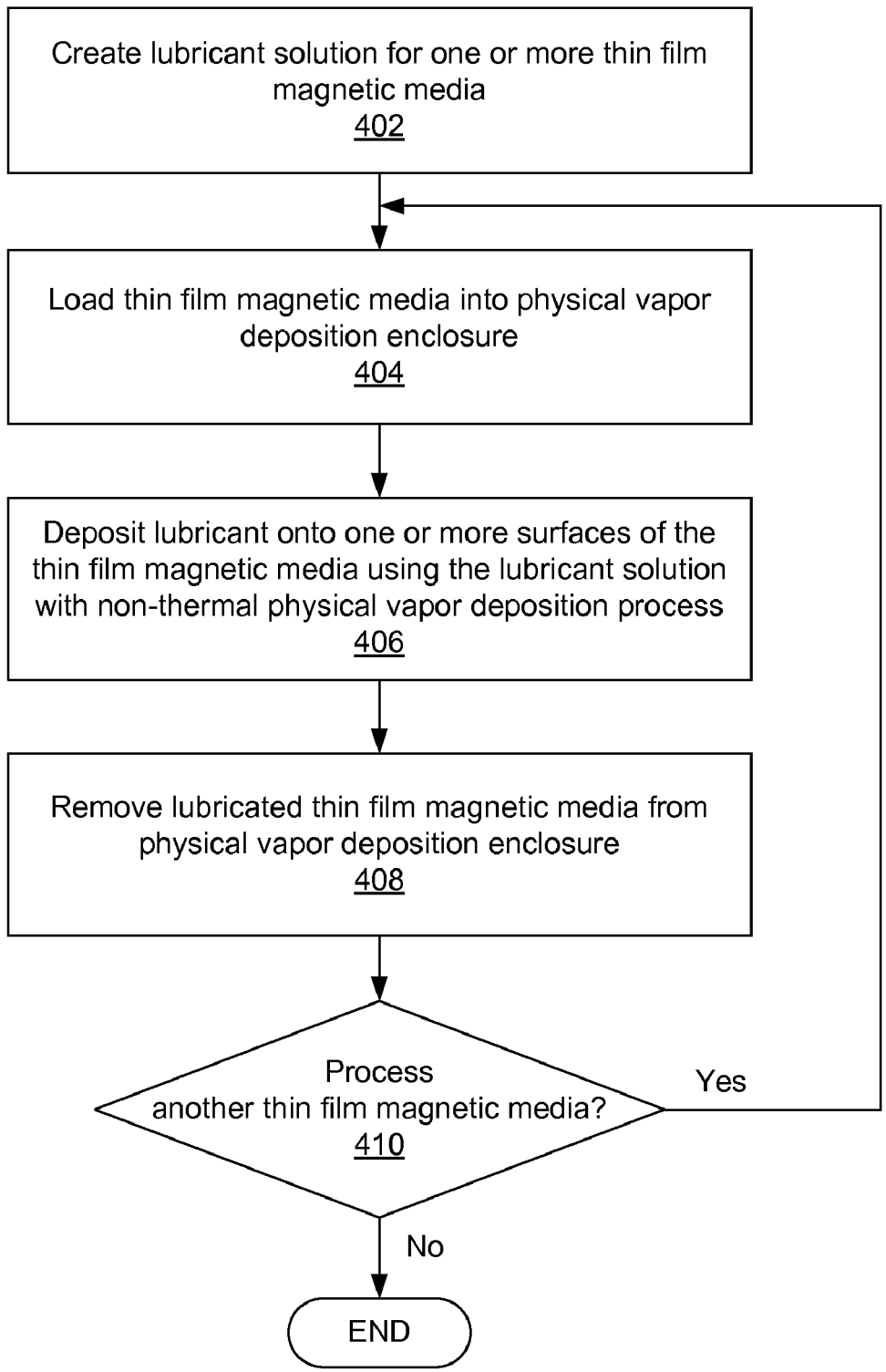
FIG. 4 is a flow diagram of a method in accordance with various embodiments of the invention.

FIG. 4 is a flow diagram of an example method 400 in accordance with various embodiments of the invention for using a non-thermal physical vapor deposition process to deposit lubricant onto thin film magnetic media. Although specific operations are disclosed in flow diagram 400, such operations are examples. Method 400 may not include all of the operations illustrated by FIG. 4. Also, method 400 may include various other operations and/or variations of the operations shown by FIG. 4. Likewise, the sequence of the operations of flow diagram 400 can be modified. It is appreciated that not all of the operations in flow diagram 400 may be performed. In various embodiments, one or more of the operations of method 400 can be controlled or managed by software, by firmware, by hardware or by any combination thereof, but is not limited to such. Method 400 can include processes of embodiments of the invention which can be controlled or managed by a processor(s) and electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium.

Specifically, method 400 can include creating one or more lubricant solutions for subsequent deposition onto one or more thin film magnetic discs. Additionally, a thin film magnetic media (or disc) can be loaded into a physical vapor deposition enclosure. Using the one or more lubricant solutions together with one or more non-thermal physical vapor deposition processes, one or more lubricants can be deposited onto one or more surfaces or sides of the thin film magnetic media. The lubricated thin film magnetic media can be removed from the physical vapor deposition enclosure. Furthermore, a determination can be made as to whether there is another thin film magnetic media to process. If so, process 400 can return to the operation involving loading a thin film magnetic media into the physical vapor deposition enclosure. However, if it is determined that there is not another thin film magnetic media to be processed, process 400 can be ended. In this manner, one or more non-thermal physical vapor deposition processes can be used to deposit one or more lubricants onto thin film magnetic media in accordance with various embodiments of the invention.

At operation 402 of FIG. 4, one or more lubricant solutions (e.g., 208 and/or 248) can be created or generated for subsequent deposition onto one or more thin film magnetic media or discs (e.g., 104 or 226). It is pointed out that operation 402 can be implemented in a wide variety of ways. For example, operation 402 can be implemented in any manner similar to that described herein, but is not limited to such.

At operation 404, a thin film magnetic media or disc (e.g., 226) can be loaded or inserted into a physical vapor deposition enclosure (e.g., 230). It is noted that operation 404 can be implemented in a wide variety of ways. For example, operation 404 can be implemented in any manner similar to that described herein, but is not limited to such.

At operation 406 of FIG. 4, using the one or more lubricant solutions together with one or more non-thermal physical vapor deposition processes, one or more lubricants can be deposited onto one or more surfaces (or sides) of the thin film magnetic media. Note that operation 406 can be implemented in a wide variety of ways. For example in one embodiment, the one or more non-thermal physical vapor deposition process at operation 406 can be implemented with, but is not limited to, one or more electrospray ionization processes. Operation 406 can be implemented in any manner similar to that described herein, but is not limited to such.

At operation 408, the lubricated thin film magnetic media can be removed from the physical vapor deposition enclosure. It is pointed out that operation 408 can be implemented in a wide variety of ways. For example, operation 408 can be implemented in any manner similar to that described herein, but is not limited to such.

At operation 410 of FIG. 4, a determination can be made as to whether there is another thin film magnetic media or disc to process. If so, process 400 can proceed to operation 404. However, if it is determined at operation 410 that there is not another thin film magnetic media or disc to be processed, process 400 can be ended. It is noted that operation 410 can be implemented in a wide variety of ways. For example, operation 410 can be implemented in any manner similar to that described herein, but is not limited to such. In this fashion, one or more non-thermal physical vapor deposition processes can be utilized to deposit one or more lubricants onto thin film magnetic media in accordance with various embodiments of the invention.

The foregoing descriptions of various specific embodiments in accordance with the invention have been presented for purposes of illustration and description. They are not intended to be exhaustive or to limit the invention to the precise forms disclosed, and many modifications and variations are possible in light of the above teaching. The invention is to be construed according to the Claims and their equivalents.

What is claimed is:

1. A method comprising:
   inserting a magnetic media into an enclosure; and
   using an electrospray ionization process to deposit a lubricant onto said magnetic media within said enclosure.

2. The method of claim 1, wherein a solution comprises said lubricant and a solvent; and
   wherein said electrospray ionization process utilizes said solution to deposit said lubricant onto said magnetic media.

3. The method of claim 2, wherein said solvent comprises a fluorinated solvent.

4. The method of claim 2, wherein said lubricant comprises a perfluoropolyether.

5. The method of claim 1, wherein said lubricant comprises a perfluoropolyether.

6. The method of claim 1, wherein said enclosure comprises a vacuum.

7. The method of claim 1, wherein said magnetic media comprises a magnetic disc comprising a tribological coating.

8. A method comprising:
   loading a magnetic media comprising a tribological coating into an enclosure; and
   using an electrospray ionization process to deposit a lubricant onto said magnetic media within a vacuum created within said enclosure.

9. The method of claim 8, wherein said electrospray ionization process comprises utilizing a negatively biased conductive capillary tip to negatively change said lubricant.

10. The method of claim 9, wherein said lubricant comprises a tetrahydroxy perfluoropolyether.

11. The method of claim 8, wherein said electrospray ionization process comprises utilizing an array of negatively biased conductive capillary tips to negatively change said lubricant.

* * * * *